Feb. 2, 1943.   R. GRAY   2,309,642
ELECTRODE SUPPORT LEAD
Filed Dec. 13, 1940
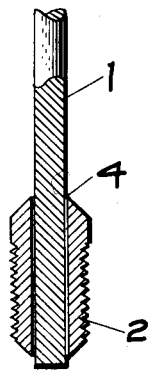
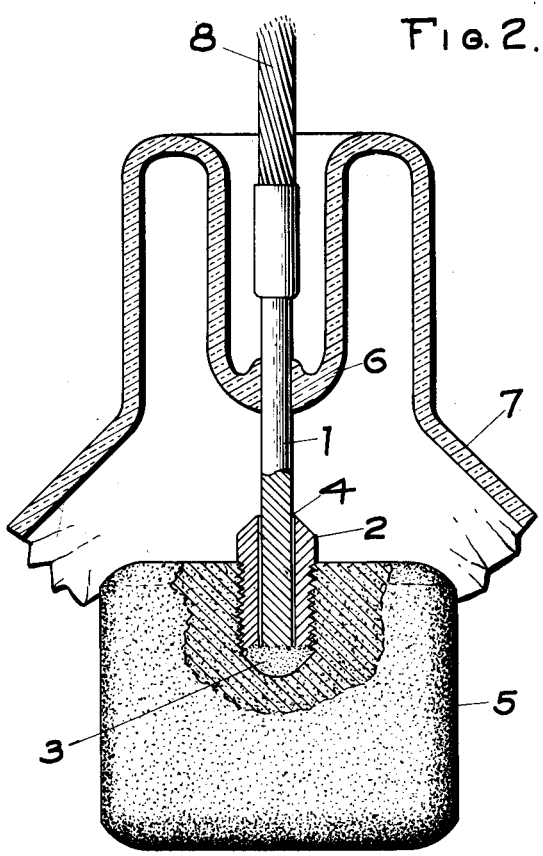
INVENTOR.
ROBERT GRAY,
BY Elmer J. Gorn
ATTY.

Patented Feb. 2, 1943

2,309,642

UNITED STATES PATENT OFFICE 2,309,642

ELECTRODE SUPPORT LEAD

Robert Gray, Waltham, Mass., assignor to Raytheon Production Corporation, Newton, Mass., a corporation of Delaware Application December 13, 1940, Serial No. 370,007

8 Claims. (Cl. 250—27.5)

This invention relates to an electrode support lead and more particularly to a lead comprising a conducting rod which supports a relatively heavy electrode such as an anode in an electrical space discharge tube.

Heretofore, supports of this kind have been made in such a way that the support lead becomes brittle during the welding together of its component parts. Such brittleness has usually occurred where stress was applied during handling and operation. As a result, such structures have been relatively fragile and a large number of fractures of the support lead structures have occurred.

An object of this invention is to make an electrode support lead structure which is strong and in which any brittleness which may occur is located where substantially no stress is applied during handling or operation.

The foregoing and other objects of this invention will be best understood from the following description of an exemplification thereof, reference being had to the accompanying drawing wherein:

Fig. 1 is a view, partly in section, of a component part of an electrode lead before the welding together; and Fig. 2 is a cross section of a portion of an electrical space discharge tube in which the completed lead arrangement of Fig. 1 is embodied.

The support lead structure is constructed of a conducting rod 1 of some suitable metal, preferably tungsten. At one end of said rod there is mounted a sleeve 2 threaded on the outside thereof so as to enable an electrode to be assembled thereon. This sleeve is made of some suitable metal such as cold rolled steel. The sleeve 2 is made with an inner diameter so that one end of the rod 1 may be snuggly fittted therein. The end of the rod 1 adjacent the outer end of the sleeve 2 is welded to said sleeve as by arc welding so as to form a welded portion 3 joining the rod 1 and sleeve 2. The other end 4 of the sleeve 2 which surrounds the rod 1 is left free. The portion 3 which is formed by the welding operation is somewhat brittle. However, due to its location, it is not subjected to any substantial stress during handling or operation and therefore there is very little likelihood of breakage occurring.

The sleeve 2 is threaded into a correspondingly threaded electrode 5 which may be the relatively massive anode of an electrical space discharge tube. In order to support the anode 5 within the tube, the rod 1 may be sealed through a stem 6 of the envelope 7 of an electrical space discharge tube. The members 6 and 7 may be of a material such as glass. The outer end of the rod 1 may be furnished with a flexible conductor 8 to which the external electrical connection is made.

This invention is not limited to the particular details as described above inasmuch as many equivalents will suggest themselves to those skilled in the art. It is accordingly desired that the appended claims be given a broad interpretation commensurate with the scope of the invention within the art.

What is claimed is:

1. An electrode support structure comprising a conducting rod, a sleeve snugly fitting around one end of said rod for a substantial distance from the outer end of said rod, said sleeve and rod being secured together only at the outer end of each respectively by means which makes the material of said structure brittle at said outer end, and means on said sleeve for securing said sleeve to an electrode.

2. An electrode support structure comprising a conducting rod, a sleeve snugly fitting around one end of said rod for a substantial distance from the outer end of said rod, said sleeve and rod being secured together only at the outer end of each respectively by means which makes the material of said structure brittle at said outer end, and an electrode secured to said sleeve.

3. An electrode support structure comprising a conducting rod, a sleeve snugly fitting around one end of said rod, said sleeve and rod being welded together only at the outer end of each respectively and means on said sleeve for securing said sleeve to an electrode.

4. An electrode support structure comprising a conducting rod of a material which becomes brittle when welded, a sleeve snugly fitting around one end of said rod, said sleeve and rod being welded together only at the outer end of each respectively and means on said sleeve for securing said sleeve to an electrode.

5. An electrode support structure comprising a conducting rod of tungsten, a sleeve snugly fitting around one end of said rod, said sleeve and rod being welded together only at the outer end of each respectively and means on said sleeve for securing said sleeve to an electrode.

6. In an electrical space discharge device, an electrode support structure comprising a conducting rod, a sleeve snugly fitting around one end of said rod for a substantial distance from the outer end of said rod, said rod and sleeve being secured together only at the outer end of each respectively by means which weakens said structure at said outer end, means on said sleeve for securing said sleeve to an electrode, said structure being supported in said device substantially solely by said rod.

7. In an electrical space discharge device, an electrode support structure comprising a conducting rod, a sleeve snugly fitting around one end of said rod for a substantial distance from the outer end of said rod, said rod and sleeve being secured together only at the outer end of each respectively by means which weakens said structure at said outer end, and an electrode secured to the outer side wall of said sleeve, said structure being supported in said device substantially solely by said rod.

8. In an electrical space discharge device, an electrode support structure comprising a conducting rod, a sleeve snugly fitting around one end of said rod for a substantial distance from the outer end of said rod, said rod and sleeve being secured together only at the outer end of each respectively by means which weakens said structure at said outer end, and an electrode secured to the outer side wall of said sleeve and projecting beyond said outer end, said structure being supported in said device substantially solely by said rod.

ROBERT GRAY.